(12) United States Patent
Foster

(10) Patent No.: US 6,931,839 B2
(45) Date of Patent: Aug. 23, 2005

(54) APPARATUS AND METHOD FOR REDUCED COLD START EMISSIONS

(75) Inventor: Michael R. Foster, Columbiaville, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/623,941

(22) Filed: Jul. 21, 2003

(65) Prior Publication Data

US 2004/0098970 A1 May 27, 2004

Related U.S. Application Data

(63) Continuation-in-part of application No. 10/304,119, filed on Nov. 25, 2002.

(51) Int. Cl.[7] ................................................. F01N 3/00
(52) U.S. Cl. .............................. 60/284; 60/274; 60/286; 60/299; 123/481
(58) Field of Search ......................... 60/274, 284, 285, 60/286, 299; 123/198 F, 481

(56) References Cited

U.S. PATENT DOCUMENTS

| | | | |
|---|---|---|---|
| 1,260,724 A | 3/1918 | Slaugher, Jr. et al. | |
| 3,091,741 A | 5/1963 | Eisaman et al. | 331/183 |
| 3,752,138 A | 8/1973 | Gaines | 123/139 R |
| 3,976,042 A | 8/1976 | Baguelin | 123/139 AR |
| 4,006,722 A | 2/1977 | Hata et al. | 123/124 A |

(Continued)

FOREIGN PATENT DOCUMENTS

| | | | | |
|---|---|---|---|---|
| DE | EP0919702 A3 | 8/2001 | ............. | F01N/3/20 |
| JP | 58-140432 | 8/1983 | ........... | F02D/17/02 |
| WO | WO9708441 | 8/1996 | ........... | F02D/17/02 |
| WO | EP0919702 A2 | 6/1999 | ............. | F01N/3/20 |
| WO | EP0846221 B1 | 11/1999 | ........... | F02D/17/02 |
| WO | WO03/048533 A1 | 6/2003 | ............. | F01N/3/00 |
| WO | WO03/048548 A1 | 6/2003 | ........... | F02D/17/02 |

OTHER PUBLICATIONS

International Search Report for PCT/US02/37775, Apr. 9, 2003, pp. I & II.

International Search Report for PCT/US02/37813, Apr. 4, 2003, pp. I & II.

Clean Diesel III, Southwest Research Institute, Jan. 2001, pp. 1–80 inc. attachments.

Primary Examiner—Thomas Denion
Assistant Examiner—Diem Tran
(74) Attorney, Agent, or Firm—Jimmy L. Funke

(57) ABSTRACT

An exhaust system for an internal combustion engine having a plurality of cylinders, comprising: a exhaust manifold for providing fluid communication of exhaust of the plurality of cylinders to a catalytic converter, the exhaust manifold comprising a first exhaust pipe and a second exhaust pipe, the first exhaust pipe being in fluid communication with the second exhaust pipe and the second exhaust pipe being in fluid communication with the catalytic converter, the first exhaust pipe providing a first fluid path for exhaust of a first plurality of cylinders of the engine and the second exhaust pipe providing a second fluid path for exhaust of a second plurality of cylinders of the engine, the second fluid path being shorter than the first fluid path; a controller for determining whether to deactivate the first plurality of cylinders in accordance with a predetermined engine starting condition, wherein deactivation of the first plurality of cylinders causes the second plurality of cylinders to operate at a condition corresponding to an engine output demand, wherein an exhaust of a first temperature is expelled by the second plurality of cylinders into the catalytic converter, the first temperature being greater than an exhaust temperature that would be generated by the first and the second plurality of cylinders operating at the condition corresponding to the engine output demand.

25 Claims, 8 Drawing Sheets

U.S. PATENT DOCUMENTS

| | | | |
|---|---|---|---|
| 4,036,014 A | 7/1977 | Ariga | 60/274 |
| 4,129,109 A | 12/1978 | Matsumoto | 123/198 F |
| 4,134,261 A | 1/1979 | Iizuka et al. | 60/276 |
| 4,143,635 A | 3/1979 | Iizuka et al. | 123/198 F |
| 4,184,470 A | 1/1980 | Iizuka | 123/198 F |
| 4,207,856 A | 6/1980 | Sugasawa et al. | 123/198 F |
| 4,256,074 A * | 3/1981 | Sugasawa et al. | 60/276 |
| 4,303,053 A | 12/1981 | Etoh et al. | 123/568 |
| 4,305,249 A | 12/1981 | Schmid et al. | 60/274 |
| 4,337,740 A | 7/1982 | Sugasawa et al. | 123/198 F |
| 4,344,393 A | 8/1982 | Etoh et al. | 123/198 F |
| 4,391,095 A | 7/1983 | Virk | 60/286 |
| 4,391,240 A | 7/1983 | Sugasawa et al. | 123/198 F |
| 4,395,875 A | 8/1983 | Virk | 60/274 |
| 4,404,796 A | 9/1983 | Wade | 60/274 |
| 4,436,060 A | 3/1984 | Tanaka et al. | 123/41.1 |
| 4,450,801 A | 5/1984 | Thedens et al. | 123/198 F |
| 4,459,952 A | 7/1984 | Holstein | 123/198 F |
| 4,467,602 A | 8/1984 | Iizuka et al. | 60/276 |
| 4,484,548 A | 11/1984 | Sugasawa et al. | 123/198 F |
| 4,550,704 A | 11/1985 | Barho et al. | 123/481 |
| 4,572,148 A | 2/1986 | Deutschmann et al. | 123/559 |
| 4,640,241 A | 2/1987 | Matsunaga | 123/198 F |
| 4,655,187 A | 4/1987 | Gravestock | 123/481 |
| 4,671,226 A | 6/1987 | van Rinsum | 123/179 F |
| 4,860,716 A | 8/1989 | Deutschmann | 123/560 |
| 4,930,455 A | 6/1990 | Creed et al. | 123/41.1 |
| 4,936,273 A | 6/1990 | Myers | 123/321 |
| 4,976,228 A | 12/1990 | Kawamura | 123/90.11 |
| 5,042,444 A | 8/1991 | Hayes et al. | 123/339 |
| 5,043,894 A | 8/1991 | Yamaguchi | 364/424.1 |
| 5,088,460 A | 2/1992 | Echeverria | 123/322 |
| 5,099,816 A | 3/1992 | Ohga et al. | 123/481 |
| 5,101,801 A | 4/1992 | Schatz | 123/556 |
| 5,117,790 A | 6/1992 | Clarke et al. | 123/321 |
| 5,138,992 A | 8/1992 | Krieger | 123/198 F |
| 5,190,013 A | 3/1993 | Dozier | 123/481 |
| 5,195,485 A | 3/1993 | Jensen et al. | 123/198 F |
| 5,249,130 A | 9/1993 | Mamiya et al. | 364/431.05 |
| 5,307,772 A | 5/1994 | Rao et al. | 123/272 |
| 5,407,130 A | 4/1995 | Uyeki et al. | 237/12.3 B |
| 5,433,182 A | 7/1995 | Augustin et al. | 123/456 |
| 5,483,941 A | 1/1996 | Cullen et al. | 123/481 |
| 5,492,100 A | 2/1996 | Ishii et al. | 123/481 |
| 5,549,093 A | 8/1996 | Imamura | 123/481 |
| 5,555,871 A | 9/1996 | Gopp et al. | 123/481 |
| 5,647,207 A | 7/1997 | Grotjahn et al. | 60/300 |
| 5,655,365 A | 8/1997 | Worth et al. | 60/285 |
| 5,695,430 A | 12/1997 | Moyer | 477/189 |
| 5,720,260 A | 2/1998 | Meyer et al. | 123/436 |
| 5,769,054 A | 6/1998 | Schnaibel et al. | 123/437 |
| 5,787,855 A | 8/1998 | Mueller et al. | 123/198 F |
| 5,802,846 A | 9/1998 | Bailey | 60/278 |
| 5,813,383 A | 9/1998 | Cummings | 123/198 F |
| 5,826,563 A | 10/1998 | Patel et al. | 123/481 |
| 5,867,982 A | 2/1999 | Tengblad et al. | 60/274 |
| 5,868,116 A | 2/1999 | Betts et al. | 123/481 |
| 5,875,743 A | 3/1999 | Dickey | 123/25 C |
| 5,894,726 A | 4/1999 | Monnier | 60/274 |
| 5,927,102 A | 7/1999 | Matsuo et al. | 62/509 |
| 5,930,992 A | 8/1999 | Esch et al. | 60/274 |
| 5,934,263 A | 8/1999 | Russ et al. | 123/698 |
| 5,979,394 A | 11/1999 | Schmidt | 123/198 F |
| 6,009,857 A | 1/2000 | Hasler et al. | 123/481 |
| 6,023,929 A | 2/2000 | Ma | 60/295 |
| 6,032,869 A | 3/2000 | Ito et al. | 237/12.3 B |
| 6,032,929 A | 3/2000 | Vatne | 254/385 |
| 6,128,899 A | 10/2000 | Oono et al. | 60/295 |
| 6,164,065 A | 12/2000 | Denari et al. | 60/284 |
| 6,178,371 B1 | 1/2001 | Light et al. | 701/93 |
| 6,209,526 B1 | 4/2001 | Sun et al. | 123/481 |
| 6,220,233 B1 | 4/2001 | Pierpont | 123/568.12 |
| 6,233,922 B1 | 5/2001 | Maloney | 60/276 |
| 6,233,927 B1 | 5/2001 | Hirota et al. | 60/297 |
| 6,237,330 B1 | 5/2001 | Takahashi et al. | 60/285 |
| 6,244,242 B1 | 6/2001 | Grizzle et al. | 123/295 |
| 6,244,258 B1 | 6/2001 | Akiyama et al. | 123/568.21 |
| 6,293,267 B1 | 9/2001 | Smith et al. | 123/568.22 |
| 6,305,344 B1 | 10/2001 | Perry | 123/198 F |
| 6,336,071 B2 | 1/2002 | Grizzle et al. | 701/115 |
| 6,349,541 B1 | 2/2002 | Gruden et al. | 60/312 |
| 6,354,266 B1 | 3/2002 | Cornell et al. | 123/322 |
| 6,360,713 B1 | 3/2002 | Kolmanovsky et al. | 123/295 |
| 6,367,443 B1 | 4/2002 | Bassi et al. | 123/198 F |
| 6,367,462 B1 | 4/2002 | McKay et al. | 123/568.21 |
| 6,382,193 B1 | 5/2002 | Boyer et al. | 123/560 |
| 6,389,806 B1 * | 5/2002 | Glugla et al. | 60/284 |
| 6,401,853 B1 | 6/2002 | Turski et al. | 180/197 |
| 6,408,618 B2 | 6/2002 | Ide | 60/285 |
| 6,422,189 B1 | 7/2002 | Pierik | 123/90.24 |
| 6,439,176 B1 | 8/2002 | Payne et al. | 123/90.12 |
| 6,467,257 B1 | 10/2002 | Khair et al. | 60/278 |
| 6,499,293 B1 | 12/2002 | Surnilla et al. | 60/285 |
| 6,499,451 B1 | 12/2002 | Hendriksma et al. | 123/90.16 |
| 6,516,608 B1 | 2/2003 | Poggio et al. | 60/284 |
| 6,535,809 B1 | 3/2003 | Beyer et al. | 701/84 |
| 6,543,398 B1 | 4/2003 | Roberts, Jr. et al. | 123/58.8 |
| 6,557,520 B2 | 5/2003 | Roberts, Jr. | 123/276 |
| 6,560,526 B1 | 5/2003 | Matekunas et al. | |
| 6,588,394 B2 | 7/2003 | Zheng | 123/198 F |
| 6,588,409 B2 | 7/2003 | Maloney et al. | |
| 6,600,989 B2 | 7/2003 | Sellnau et al. | |
| 6,615,129 B2 | 9/2003 | Kabasin | 701/110 |
| 6,619,258 B2 | 9/2003 | McKay et al. | 123/350 |
| 6,622,691 B2 | 9/2003 | Bagnasco et al. | 123/295 |
| 6,637,413 B2 | 10/2003 | Maloney et al. | |
| 6,662,761 B1 | 12/2003 | Melchior | 123/41.44 |
| 6,668,546 B2 * | 12/2003 | Hayman et al. | 60/284 |
| 2001/0002379 A1 | 5/2001 | Schechter | 477/115 |
| 2001/0002538 A1 | 6/2001 | Katsuta et al. | 60/284 |
| 2001/0050070 A1 | 12/2001 | Xu et al. | 123/295 |
| 2002/0020169 A1 | 2/2002 | Ketcher | 60/285 |
| 2002/0059915 A1 | 5/2002 | Houston et al. | 123/305 |
| 2003/0041836 A1 | 3/2003 | Roberts, Jr. | 123/276 |
| 2003/0066507 A1 | 4/2003 | Roberts, Jr. | 123/256 |
| 2003/0074893 A1 | 4/2003 | Webb et al. | 60/285 |
| 2003/0101961 A1 | 6/2003 | Foster | 123/198 F |
| 2003/0121249 A1 | 7/2003 | Foster et al. | 60/285 |

* cited by examiner

APPARATUS AND METHOD FOR REDUCED COLD START EMISSIONS

CROSS REFERENCE TO RELATED APPLICATIONS

This application is a continuation-in-part application of commonly owned and assigned U.S. patent application Ser. No. 10/304,119 filed Nov. 25, 2002, the contents of which are incorporated herein by reference thereto.

This application is also related to commonly owned and assigned U.S. patent application Ser. No. 10/304,029 filed Nov. 25, 2002, the contents of which are incorporated herein by reference thereto.

TECHNICAL FIELD

This application relates to a method and apparatus for reducing exhaust emissions of an engine in particular, a method and apparatus for reducing cold start exhaust emissions.

BACKGROUND

Federal and state governments have imposed increasingly strict regulations over the years governing the levels of hydrocarbon (HC), carbon monoxide (CO) and nitrogen oxide (NOx) pollutants that a motor vehicle may emit to the atmosphere.

Vehicle emission performance is measured by a vehicle dynamometer test schedule determined by the Federal, and sometimes State Governments. Other countries have different emission tests based on their particular needs. During the vehicle emissions test, harmful materials such as hydrocarbons, HC, carbon dioxide, CO, and nitrous oxides, NOx, are measured at the vehicles tailpipe in terms of grams per mile or other units capable of being used in a standardized test.

One approach to reducing the emissions of these pollutants involves the use of a catalytic converter. Placed within the exhaust gas stream between the exhaust manifold of the engine and the muffler, the catalytic converter is one of the several emissions control devices typically found on a motor vehicle.

Catalytic converters consist of a ceramic substrate with many channels for exhaust flow to pass through. These channels are coated with a wash-coat and catalyst such as Platinum, Palladium, and Rhodium. The catalyst coated substrate is then wrapped with either an intumescent mat material such as 3M Company's Interam 100 or a non-intumescent mat material such as Interam 1101 HT to adjust for manufacturing tolerances, and to retain the catalyst in its steel container. Catalytic converters speed chemical reactions without taking part in the reactions. To function with significant efficiency a catalytic converter must be warmed by engine exhaust flow to its minimum operating temperature, this is normally a temperature of greater than about 350 degrees C., for automotive catalytic converters.

The catalytic converter is essentially a reaction chamber that contains an oxidation catalyst, typically in the form of one or more monolithic substrates, coated with a high surface area ceramic wash-coat and one or more precious metals such as Platinum, Palladium or Rhodium. When the engine is running, the exhaust gases from the exhaust manifold flow through the converter and pass heat to those composite materials housed within it. Once heated to a suitably high temperature, the composite materials convert a large percentage of the pollutants in the passing exhaust gases to carbon dioxide ($CO_2$), water ($H_2O$) and other benign substances. Until the converter is brought up to operating temperature, however, its composite materials do not operate as effectively. As is well known to individuals skilled in the related arts, the catalytic converter is particularly inefficient when it is at its coolest, just after the engine is started cold.

A large percentage of a vehicles total cold start, HC emissions occur during the time period while the catalytic converter is warming up to operating temperature.

To reduce the emissions of harmful materials, particularly during initial cold-start-up, several attempts have been made to reduce cold start emissions, for example: the catalytic converter has been moved as close to the engine as possible. In cases where the entire converter could not be moved close enough to the engine, a smaller warm-up converter is often used ahead of a second under-floor converter. In addition, catalytic converter improvements such as improved catalysts, and high-cell-density ceramic substrates with very thin walls that require less heat energy to reach operating temperature have been employed to reduce cold start emissions. Also, engine improvements such as electronic fuel injection, with closed loop-air-fuel ratio control, have also been employed to reduce tailpipe emissions.

As mentioned above, one approach that has been proposed to reduce the emission of HC, CO and NOx pollutants while the exhaust system is cold is to use a second catalytic converter, often referred to as a warm-up converter. The warm-up converter would be small in size and located near the engine so that it could warm-up quickly. It would employ composite materials (i.e., a substrate, an oxidation catalyst and catalytic material coating) specially formulated to reach operating temperature quickly, thereby quickly rendering the warm-up converter capable of efficiently converting the pollutants in the exhaust gas. This is significant, as most of the pollutants are produced during the first minute or two after the engine is started. Until the engine and exhaust system have warmed to the point at which the conventional converter is operating more effectively, the exhaust gases during this "warm-up period" would be routed into the warm-up converter to remove the pollutants from the exhaust gases.

Given its proximity to the engine, and small size the warm-up converter will generally not be able to withstand continuous exposure to certain harmful poisons carried by the exhaust gases without a significant loss in performance. In particular, engine oil that may have been burned in the combustion chambers will be carried away by the exhaust gases into the exhaust system. Certain compounds in the oil, such as zinc-dithio-phosphate, will gradually coat the catalyst in the warm-up converter and reduce or significantly reduce its effectiveness. Prolonged exposure to the exhaust gases will therefore prematurely degrade the composite materials inside the warm-up converter.

A solution to this problem would be to strategically place an exhaust control valve within the exhaust system. Controlled by the engine control module (ECM) or other control component with feedback from a suitable sensor, the exhaust control valve can be automatically opened to allow exhaust gases to flow through the warm-up converter during the warm-up period and closed to prevent such flow afterward. By switching the flow of the exhaust gases away from the warm-up converter after the warm-up period, the exhaust control valve would then protect it from the relatively high temperatures and the harmful compounds carried by the exhaust gases. This tends to keep the warm-up converter free of poisons and highly effective during the warm-up period.

After the warm-up period, the conventional converter due to its large size best treats the HC, CO and NO x pollutants. The large size of the conventional converter makes it more resistant to such poisoning. Due to the increased cost and questionable reliability of exhaust systems with valves, vehicle manufactures have not used them to maintain warm-up converter performance.

Despite improvements vehicle manufacturers have made they are continually challenged by the reductions in allowable grams per mile of tail pipe emissions, mandated by the Federal Government, and certain State Governments such as California with high levels of air borne emissions in their cities, and to do this in a low cost, reliable manner. Accordingly, it is desirable to improve the cold start emissions of a vehicle by providing methods and apparatus for meeting the mandated emissions standards at minimum cost, and without reducing reliability.

SUMMARY

The above discussed and other drawbacks and deficiencies are overcome or alleviated by an exhaust system for an internal combustion engine having a plurality of cylinders, comprising: a exhaust manifold for providing fluid communication of exhaust of the plurality of cylinders to a catalytic converter, the exhaust manifold comprising a first exhaust pipe and a second exhaust pipe, the first exhaust pipe being in fluid communication with the second exhaust pipe and the second exhaust pipe being in fluid communication with the catalytic converter, the first exhaust pipe providing a first fluid path for exhaust of a first plurality of cylinders of the engine and the second exhaust pipe providing a second fluid path for exhaust of a second plurality of cylinders of the engine, the second fluid path being shorter than the first fluid path; a controller for determining whether to deactivate the first plurality of cylinders in accordance with a predetermined engine starting condition, wherein deactivation of the first plurality of cylinders causes the second plurality of cylinders to operate at a condition corresponding to an engine output demand, wherein an exhaust of a first temperature is expelled by the second plurality of cylinders into the catalytic converter, the first temperature being greater than an exhaust temperature that would be generated by the first and the second plurality of cylinders operating at the condition corresponding to the engine output demand.

A method for reducing exhaust emissions of an engine having a plurality cylinders each having exhaust ports coupled to an exhaust system, the method comprising: determining a first plurality and a second plurality of the plurality of cylinders, the first plurality of cylinders having a longer exhaust path to the catalytic converter than the second plurality of cylinders; determining if the engine is being started from a cold state by sampling at least the temperature of the engine deactivating the first plurality of cylinders if the engine is being started from a cold state; supplying additional fuel and air to the second plurality of cylinders, wherein deactivation of the first plurality cylinders causes the second plurality of cylinders to operate at a condition corresponding to an engine output demand, wherein an exhaust of a first temperature is expelled by the second plurality of cylinders into the warm up converter, the first temperature being greater than an exhaust temperature that would be generated by all plurality of cylinders operating at the condition corresponding to the engine output demand.

An exhaust system for a vehicle having an internal combustion engine with a plurality of cylinders, comprising: a pair of exhaust manifolds each providing fluid communication of exhaust of a plurality of cylinders to a catalytic converter, each of the pair of exhaust manifolds comprising a first exhaust pipe portion and a second exhaust pipe portion, the first exhaust pipe portion being in fluid communication with the second exhaust pipe portion and the second exhaust pipe portion being in fluid communication with the catalytic converter, the first exhaust pipe portion providing a first fluid path for exhaust of a first plurality of cylinders of the engine and the second exhaust pipe portion providing a second fluid path for exhaust of a second plurality of cylinders of the engine, the second fluid path being shorter than the first fluid path; and a controller for determining whether to deactivate predetermined cylinders of the first plurality of cylinders and predetermined cylinders of the second plurality of cylinders in accordance with a predetermined engine starting condition, wherein deactivation of the predetermined cylinders of the first plurality of cylinders and the predetermined cylinders of the second plurality of cylinders causes the remaining active cylinders of the first plurality of cylinders and the second plurality of cylinders to operate at a condition corresponding to an engine output demand, wherein an exhaust of a first temperature is expelled by the remaining active cylinders of the first plurality of cylinders and the second plurality of cylinders into the catalytic converters of the first exhaust portion and the second exhaust portion, the first temperature being greater than an exhaust temperature that would be generated by the all of the first and the second plurality of cylinders operating at the condition corresponding to the engine output demand.

An exhaust system for a vehicle having an internal combustion engine with a plurality of cylinders, comprising: a pair of exhaust manifolds each providing fluid communication of exhaust of a plurality of cylinders to a single catalytic converter, each of the pair of exhaust manifolds comprising a first exhaust pipe portion and a second exhaust pipe portion, the first exhaust pipe portion being in fluid communication with the second exhaust pipe portion and the second exhaust pipe portion being in fluid communication with the catalytic converter, the first exhaust pipe portion providing a first fluid path for exhaust of a first plurality of the plurality of cylinders of the engine and the second exhaust pipe portion providing a second fluid path for exhaust of a second plurality of the plurality of cylinders of the engine, the second fluid path being shorter than the first fluid path; a warm up converter disposed between the single catalytic converter and one of the pair of the exhaust manifolds wherein the other one of the pair of the exhaust manifolds provides fluid communication to the single catalytic converter without passing through the warm up converter; and a controller for determining whether to deactivate predetermined cylinders of the plurality of cylinders, in accordance with a predetermined engine starting condition, the predetermined cylinders being in fluid communication with the warm up converter, wherein deactivation of the predetermined cylinders of the plurality of cylinders causes the remaining active cylinders of the plurality of cylinders to operate at a condition corresponding to an engine output demand, wherein an exhaust of a first temperature is expelled by the remaining active cylinders of the plurality of cylinders into the warm up converter, the first temperature being greater than an exhaust temperature that would be generated by all plurality of cylinders operating at the condition corresponding to the engine output demand.

The above-described and other features and advantages of the present invention will be appreciated and understood by those skilled in the art from the following detailed description, drawings, and appended claims.

DETAILED DESCRIPTION OF EXEMPLARY EMBODIMENTS

Disclosed herein is an apparatus and system that limits the cold start emissions of a vehicle engine by deactivating certain cylinders of the engine wherein the catalytic converter is brought to its operating temperature as quickly as possible.

Figure 1:
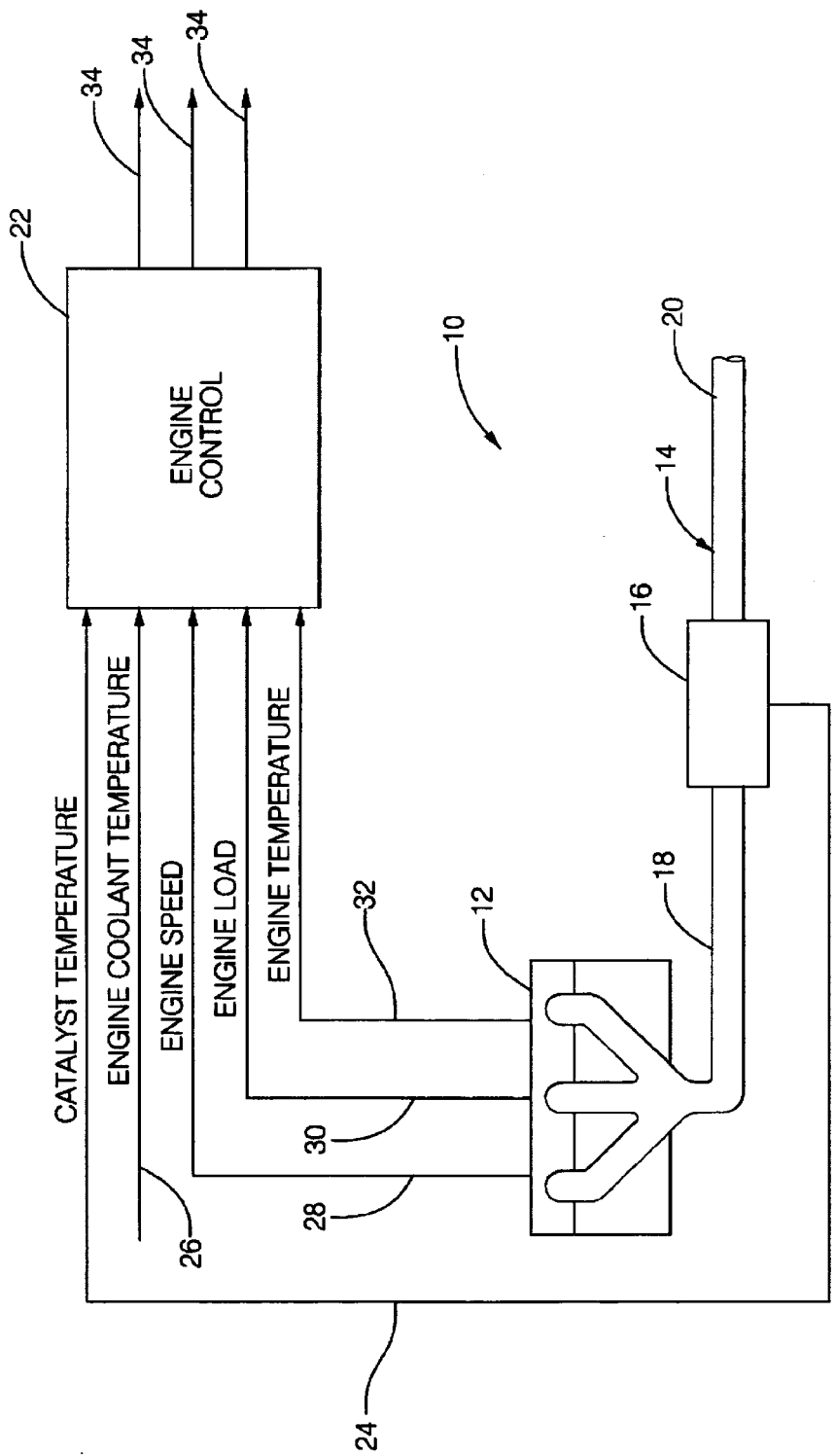
FIG. 1 is a schematic illustration of an exhaust system coupled to an engine.

Referring now to FIG. 1 a portion of an exhaust control system of a vehicle (not shown) is illustrated schematically. In general, an internal combustion engine 12 is coupled to an exhaust system 14. Exhaust system 14 comprises a catalyst 16 fluidly coupled to an inlet conduit 18 and an outlet conduit 20. Inlet conduit 18 provides a fluid path for untreated exhaust gas of engine 12 and outlet conduit 20 provides a fluid path for gas treated by the catalyst to pass onto other components of the exhaust system and ultimately into ambient air.

Exhaust control system 10 further comprises a controller or an engine control module (ECM) 22. Engine control module 22 comprises among other elements a microprocessor for receiving signals indicative of the vehicle performance as well as providing signals for control of various system components, read only memory in the form of an electronic storage medium for executable programs or algorithms and calibration values or constants, random access memory and data buses for allowing the necessary communications (e.g., input, output and within the ECM) with the ECM in accordance with known technologies.

The ECM receives various signals from various sensors in order to determine whether the engine is being started in a "cold start" state as well as perform and/or control other vehicle operations. Some of the sensors which provide input to the ECM include but are not limited to the following: engine coolant temperature 26, engine speed 28, engine load 30, engine temperature 32 and engine air/fuel ratio obtained by an exhaust system sensor 24. The sensors used may also be related in part to the type of engine being used (e.g., water cooled, air cooled, diesel, gas, hybrid, etc.). Exhaust system sensor 24 may be a catalyst temperature probe 24 or other equivalent means or method for measuring the converter temperature. An example of one such device is disclosed in commonly owned and assigned U.S. patent application Ser. No. 10/286,201, filed Oct. 31, 2002, the contents of which are incorporated herein by reference thereto.

In accordance with operating programs, algorithms, look up tables and constants resident upon the microcomputer of the ECM various output signals 34 are provided by the ECM. These signals can be used to control cylinder deactivation (e.g., limiting or shutting off fuel flow as well as closing the intake and exhaust valves of the deactivated cylinders) as well as performing other vehicle operations including but not limited to: fuel/air flow control to maintain optimum, lean or rich stoichiometry as may be required to provide the required torque output and higher exhaust temperature in the non-deactivated cylinders; spark timing; engine output; and providing on board malfunctioning diagnostic (OBD) means to the vehicle operator. As is known in the related arts and as used herein "lean" is meant to include engines that can be operated with an inlet oxygen concentration greater than the amount required for stoichiometric (or chemically correct) combustion of a hydrocarbon fuel whereas "rich" is meant to include engines operated with a greater amount of fuel.

Figure 2:
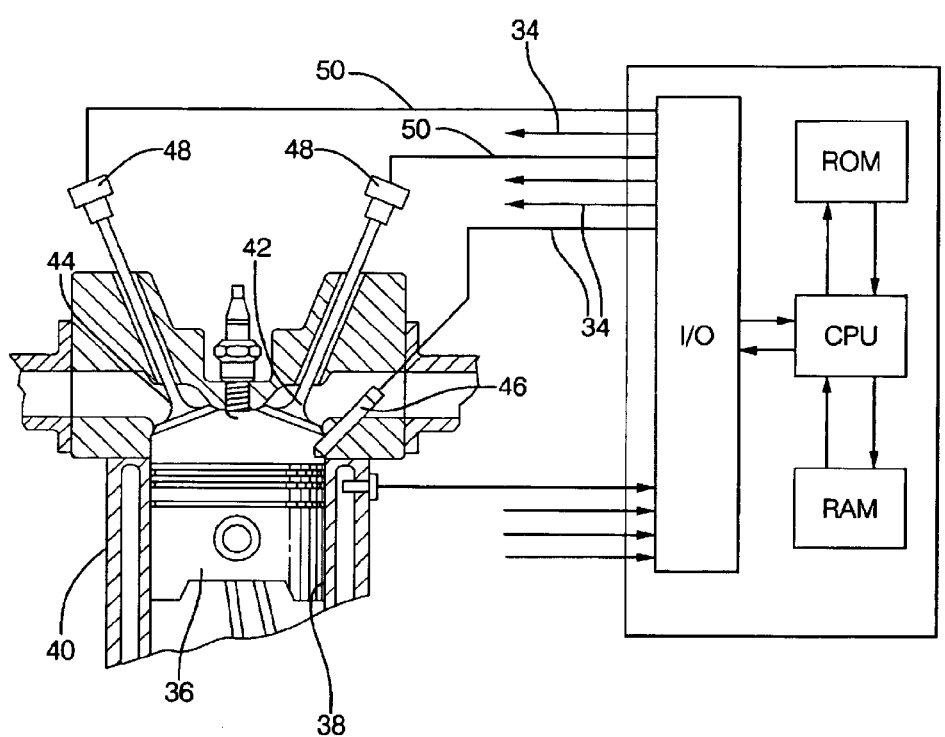
FIG. 2 is a schematic illustration of a control system for controlling a cylinder of an engine.

Referring now to FIG. 2 a schematic illustration of a method and apparatus for the ECM to deactivate a cylinder (shown in cross section) of the internal combustion engine is illustrated. For ease of explanation only a cylinder is shown, of course, it is contemplated that the ECM may control or deactivate as many cylinders as necessary to reduce engine emissions during a "cold start" as well as provide other vehicle commands or control.

As is known in the related arts of internal combustion engines a piston 36 moves within a cylinder 38 of an engine block 40 of the engine. The engine may comprise any number of cylinders (e.g., 2, 4, 6, 8, 10, 12, etc.). For each cylinder there is an intake valve 42 and an exhaust valve 44. As is known in the related arts the intake and exhaust valves are positioned to periodically open and close during operation of the engine. In addition, a means 46 (e.g., fuel injector or equivalent thereof) for supplying fuel for the combustion operation is provided proximate to the intake valve. The fuel injector varies the amount of fuel supplied to the engine by receiving a signal from the ECM, which uses control logic (e.g., engine load, rpm) to vary the amount of fuel supplied to the cylinder. Also, the location of the fuel injector may vary for example the fuel injector may be positioned to supply fuel into the intake chamber as opposed to the combustion chamber as illustrated in FIG. 2.

In accordance with an exemplary embodiment actuatable devices 48 are positioned to provide the necessary movement of the intake and exhaust valves or as will be discussed herein provide the necessary force to retard the movement of the valves. The actuating devices are also controllable through signals received from the ECM via signal lines 50. Actuating devices 48 may be electromechanical devices such as solenoids or equivalents thereof wherein movement of the intake and exhaust valves is controllable from signals received from the ECM.

ECM has look up tables corresponding to particular engine operations for different operating states, timing intake and exhaust valves, fuel injection and ignition. In addition, the look up tables of the ECM are configured for the particular engine (e.g., diesel, gas, 4, 6. 8 cylinder, etc.).

As discussed above operation of the engine is determined by the ECM, which receives a plurality of signals corresponding to air/fuel ratio 24, engine coolant temperature 26, engine speed 28, engine load 30, and engine temperature 32. The ECM is a microcomputer comprising a microprocessor, input/output ports, read only memory in the form of an electronic storage medium for executable programs or algorithms and calibration values or constants, random access memory, as well as data buses for allowing the necessary communications within ECM in accordance with known technologies.

The ECM receives various signals from various sensors in order to determine whether the engine is being started in a "cold start" and the emissions control strategy of an exemplary embodiment of the present invention is to be employed. A control algorithm of the ECM will have a routine to determine whether the engine is being started in a "cold start", which may be determined from a variety of factors including but not limited to the following inputs received as corresponding signals to the ECM: engine temp; intake air temp; coolant temp etc.; or other signals necessary to determine that the engine is starting in a condition wherein cold start emissions of the engine, as discussed above, are to be reduced. In another embodiment, the control algorithm will also be able to determine if the catalytic converter is below a temperature for good catalytic activity (e.g., approximately 350 degrees Celsius, of course the aforementioned temperature may vary in part due to the configuration and/or materials of the catalytic converter) wherein the control algorithm will monitor the catalyst temperature during engine operation and upon detection of a temperature below a predetermined level mentioned above with regard to good catalytic activity, the control algorithm will implement any one of the various embodiments of the present invention to reduce the emissions of the system. An example of such an occurrence may be the result of the engine idling for a long period of time, or the engine being simply operated at such a low load that the catalytic converter cooled to a temperature less than about 350 degree C. or other temperature determined to provide good catalytic activity. This embodiment will address engine operating situations wherein cylinder deactivation has been implemented at engine start to warm up the converter and upon reactivating of the deactivated cylinders the system may again deactivate cylinders to warm the converter back up to an optimum operation temperature.

It is also understood that the control algorithm will employ a series of steps or commands wherein it is determined that the engine will still be able to meet the necessary output demands while implementing the cylinder deactivation methodology disclosed herein. For example, the control algorithm will be able to determine whether cylinder deactivation is applicable given the required engine output.

In accordance with an exemplary embodiment and if the ECM has determined that the engine is being started in a cold start phase or alternatively if the engine is operating and the catalytic converter has cooled to a temperature less than a temperature determined to provide good catalytic activity, the fuel supply to certain predetermined cylinders is shut off and the corresponding intake and exhaust valves are closed as well. As will be discussed herein the number and location of the predetermined cylinders to be shut off during a "cold start" may vary. Some factors, which determine what cylinders, are to be shut off depends on the type of engine and it configuration as well as the exhaust system configuration.

In one embodiment and during a "cold start" operation, fuel is shut off to the deactivated cylinders and the intake and exhaust valves of the deactivated cylinders are closed once the engine is running. In one embodiment, and prior to the starting of the engine (e.g., cranking event prior to combustion) the intake and exhaust valves are allowed to open to allow the engine to start thereby reducing the required load upon the starter motor. Alternatively, only the intake or exhaust valve of the deactivated cylinder is closed while the other is open during the cranking of the engine. In yet another alternative, the valves remain completely closed during the cranking of the engine.

In an exemplary embodiment the intake and exhaust valves are deactivated at an optimum point of travel of the piston in the deactivated cylinder during the cranking of the engine wherein an air charge is captured in the combustion chamber and as the piston travels back up in the cylinder the trapped air is compressed and results in a downward force being applied to the piston. Thus, the deactivated cylinder will not create a vacuum in the combustion chamber, which would adversely affect the fuel efficiency of the engine during a "cold start" with certain cylinders deactivated. Also, the compressed air in the combustion chamber will prevent oil being pulled past the piston ring of the deactivated cylinder.

Once the ECM determines that the engine is running in a cold start scenario the intake and exhaust valves of the deactivated cylinders are closed while the ECM has already disabled the fuel supply and spark. In order to provide the additional torque to start the engine as well as overcome the compression forces in the deactivated cylinders due to the intake and exhaust valves being closed, extra fuel is provided to the operating cylinders to provide the necessary torque. Or alternatively, cylinder deactivation is delayed until after the engine has started. This delay could be varied to suit a particular application, but generally would occur as quickly as possible, and most likely immediately (within a second or 2 of first cylinder ignition) and/or after reaching a stable idle condition.

After an engine cold start, heat loss is reduced through cylinder deactivation by burning the fuel normally used in the deactivated cylinders in the active cylinders. This raises the exhaust gas temperature discharged from these active cylinders, providing heat energy at a higher temperature to warm the catalytic converter to an operating temperature more quickly. Upon reaching the optimum operating temperature of the catalytic converter the system will in accordance with an alternative embodiment continuously monitor the catalytic converter to see if the converter has cooled to a temperature less than a temperature determined to provide good catalytic activity, wherein further cylinder deactivation may be implemented to warm the converter back up. Also, the system will reactivate the remaining cylinders when the converter is operating at a proper temperature and if the engine out demands warrants operation of all of the cylinders.

Figures 3, 4:
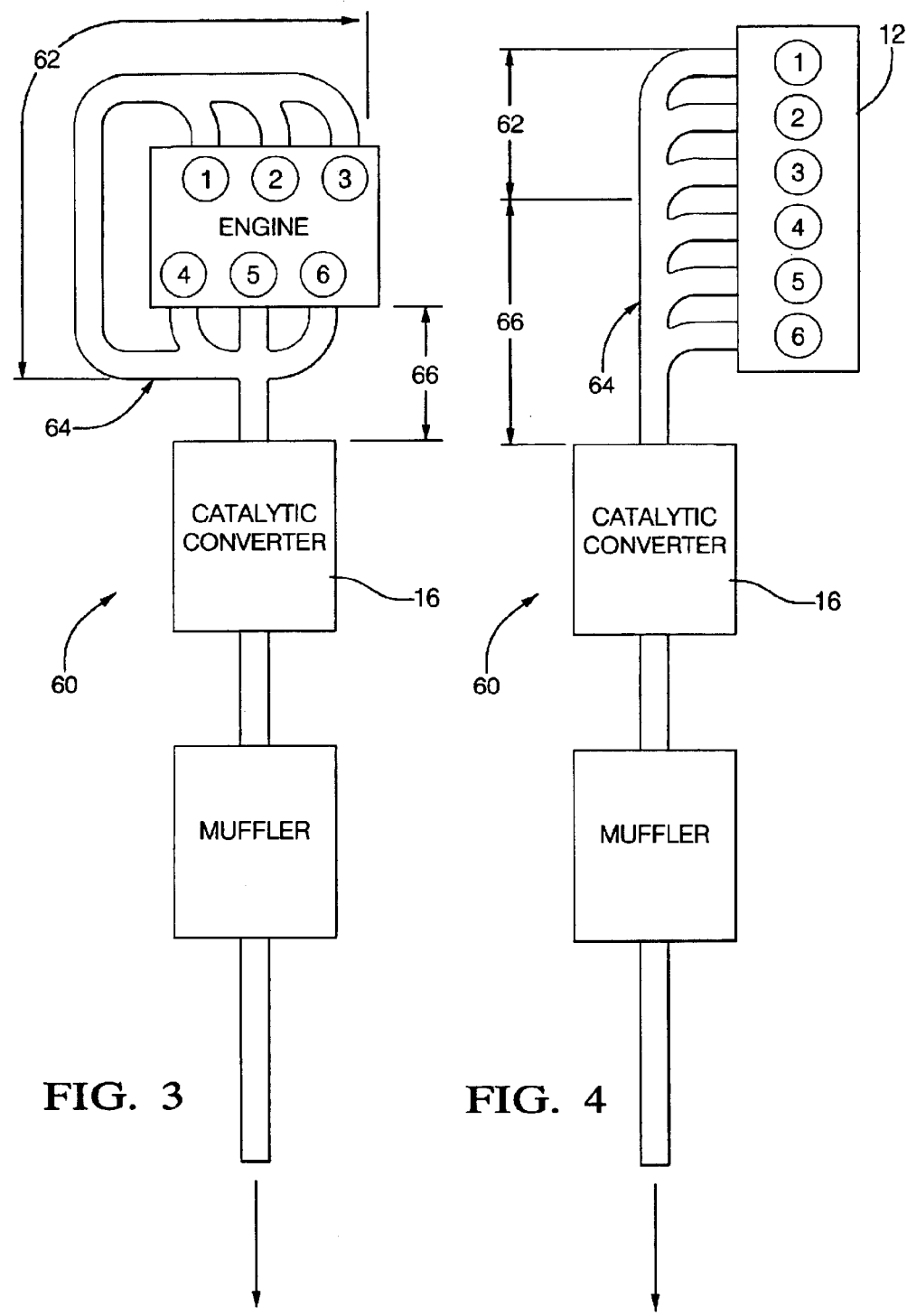
FIG. 3 is a schematic illustration of an exhaust system of an exemplary embodiment of the present invention.
FIG. 4 is a schematic illustration of an exhaust system of an alternative exemplary embodiment of the present invention.

Referring now to FIG. 3, an exhaust system 60 configured to reduce the time required to provide the necessary heat in order to obtain catalyst-operating temperatures for good emission control is illustrated. Exhaust system 60 in combination with specific cylinder deactivation allows this to be done by effectively eliminating a portion 62 of an exhaust manifold 64 of the engine. Portion 62 comprises the longest path from exhaust ports of the cylinders of the engine, which in accordance with an exemplary embodiment are the exhaust ports of the cylinders being deactivated by the ECM, which in accordance with a control algorithm determines whether the engine is being started in a "cold start" and if cylinder deactivation is required. By effectively eliminating portion 62 of the exhaust manifold, the thermal energy normally used to heat this portion of the manifold is available to heat the catalyst (via portion 66) to its operating temperature more rapidly for better emission control.

Eliminating portion 62 of the exhaust manifold is achieved in this embodiment by choosing cylinders 1, 2 and 3, to be deactivated after start-up or during start-up, when the ECM has determined a "cold start" is occurring. Accordingly, no heat energy is expended to heat up portion 62 since cylinders 1, 2, and 3 are deactivated. Therefore, during the warm-up mode, when cylinders, 1, 2, and 3, are deactivated, only a small portion 66 of the exhaust manifold, is used for the active cylinders 4, 5, and 6 in this configuration. Because portion 66 is significantly shorter that portion 62, it absorbs less than ½ the thermal energy than would be absorbed if cylinder deactivation was not used. This thermal energy is now available to heat the catalyst to operating temperature more quickly.

Referring now to FIG. 4, an alternative embodiment of an exemplary embodiment of the present invention is illustrated. Here engine 12 is an "in-line" six cylinder and exhaust manifold 64 is configured to be in fluid communication with all of the cylinders, which are positioned on one side of the engine. Similar to the FIG. 3 embodiment portion 62 of the exhaust manifold 64 is eliminated while portion 66 is the shortest length to the catalytic converter and portion 66 is heated by cylinders 4, 5 and 6, which remain activated during a "cold start".

Figure 5:
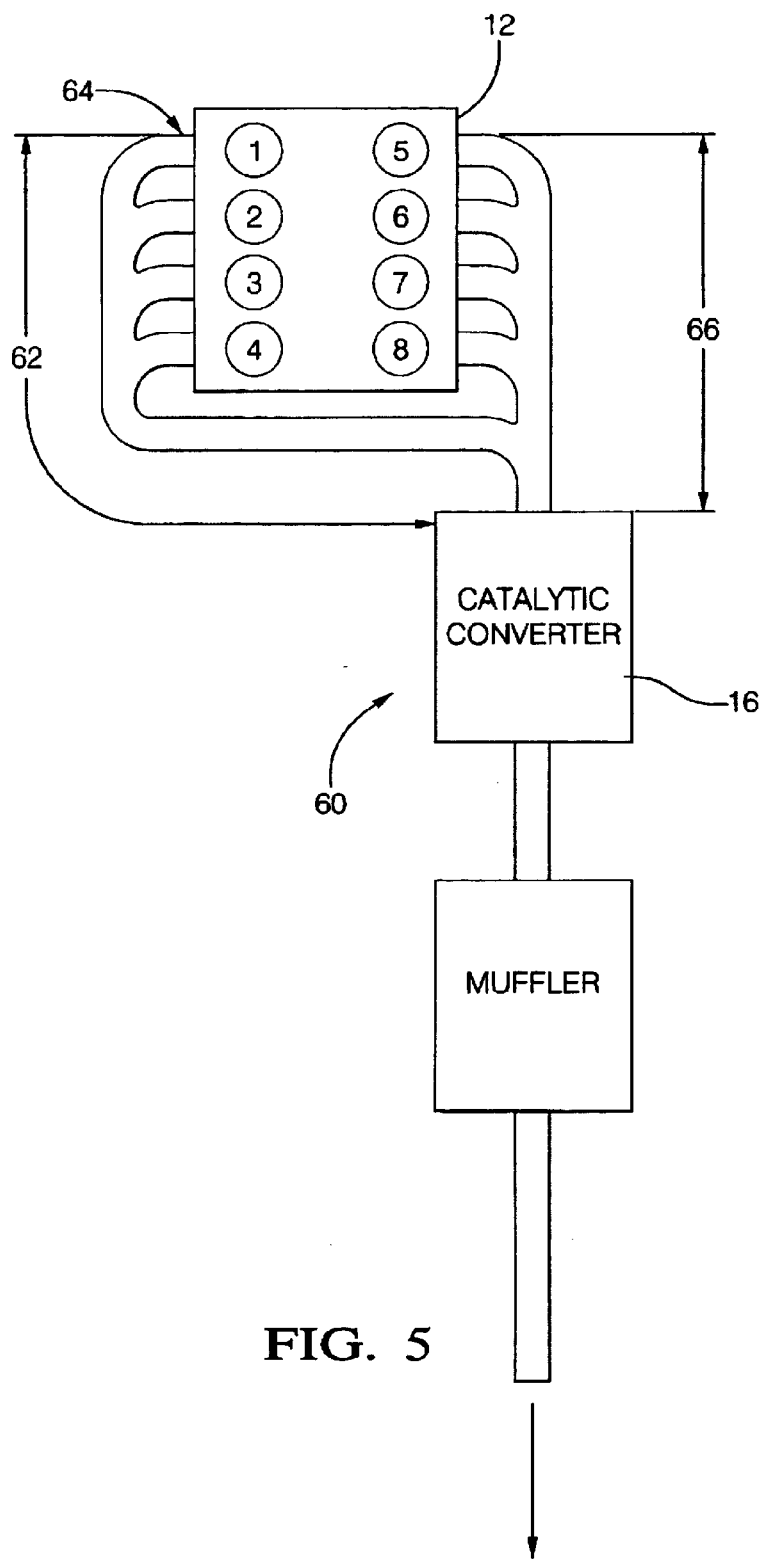
FIG. 5 is a schematic illustration of an exhaust system of another alternative exemplary embodiment of the present invention.

Referring now to FIG. 5, another alternative embodiment of an exemplary embodiment of the present invention is illustrated. Here engine 12 is a "V8" eight cylinder engine and exhaust manifold 64 is configured to be in fluid communication with all of the cylinders, wherein four cylinders are positioned on other side of the engine. Similar, to the embodiments of FIGS. 3 and 4 portion 62 of the exhaust manifold 64 is eliminated while portion 66 is the shortest length to the catalytic converter and portion 66 is heated by cylinders 5, 6, 7 and 8, which remain activated during a "cold start". Empirical studies have shown that exhaust temperatures during cylinder deactivation of an eight-cylinder engine have produced exhaust gases at least 75 degrees C. hotter than those which would have be produced under the same load if all eight cylinders were activated.

Figure 6:
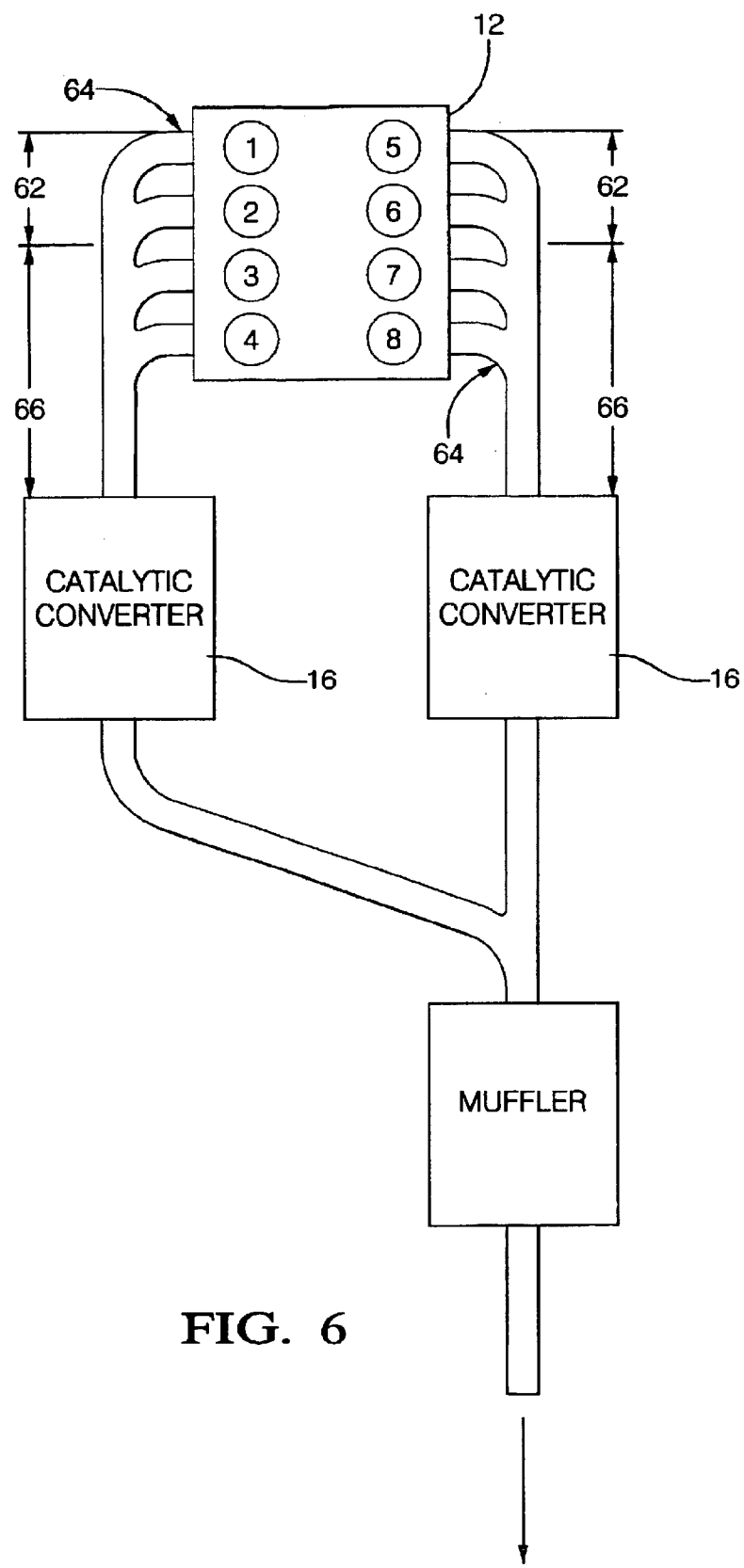
FIG. 6 is a schematic illustration of an exhaust system of still another alternative exemplary embodiment of the present invention.

Referring now to FIG. 6, another alternative embodiment of an exemplary embodiment of the present invention is illustrated. Here engine 12 is also a "V8" eight cylinder and a pair of exhaust manifolds 64 are configured to be in fluid communication with all of the cylinders, which are evenly positioned on both sides of the engine. In this embodiment two catalytic converters 16 are provided, one being in fluid communication with one of the exhaust manifolds and the other is in fluid communication with the other exhaust manifold. Similar to the previous embodiments a portion 62 of each of the exhaust manifolds is eliminated while portion 66 is the shortest length to the respective catalytic converter and portion 66 is heated by cylinders 3 and 4 on one side and cylinders 7 and 8 on the other, which remain activated during a "cold start". This would provide the most rapid simultaneous heating of both catalytic converters 16. If heating of just one catalytic converter was most desirable, based upon a particular exhaust emission test driving cycle and/or exhaust system design, cylinders 5, 6, 7, and 8, might be activated while cylinders 1, 2, 3, and 4, would be deactivated, shortly after, or during start-up.

Figure 7:
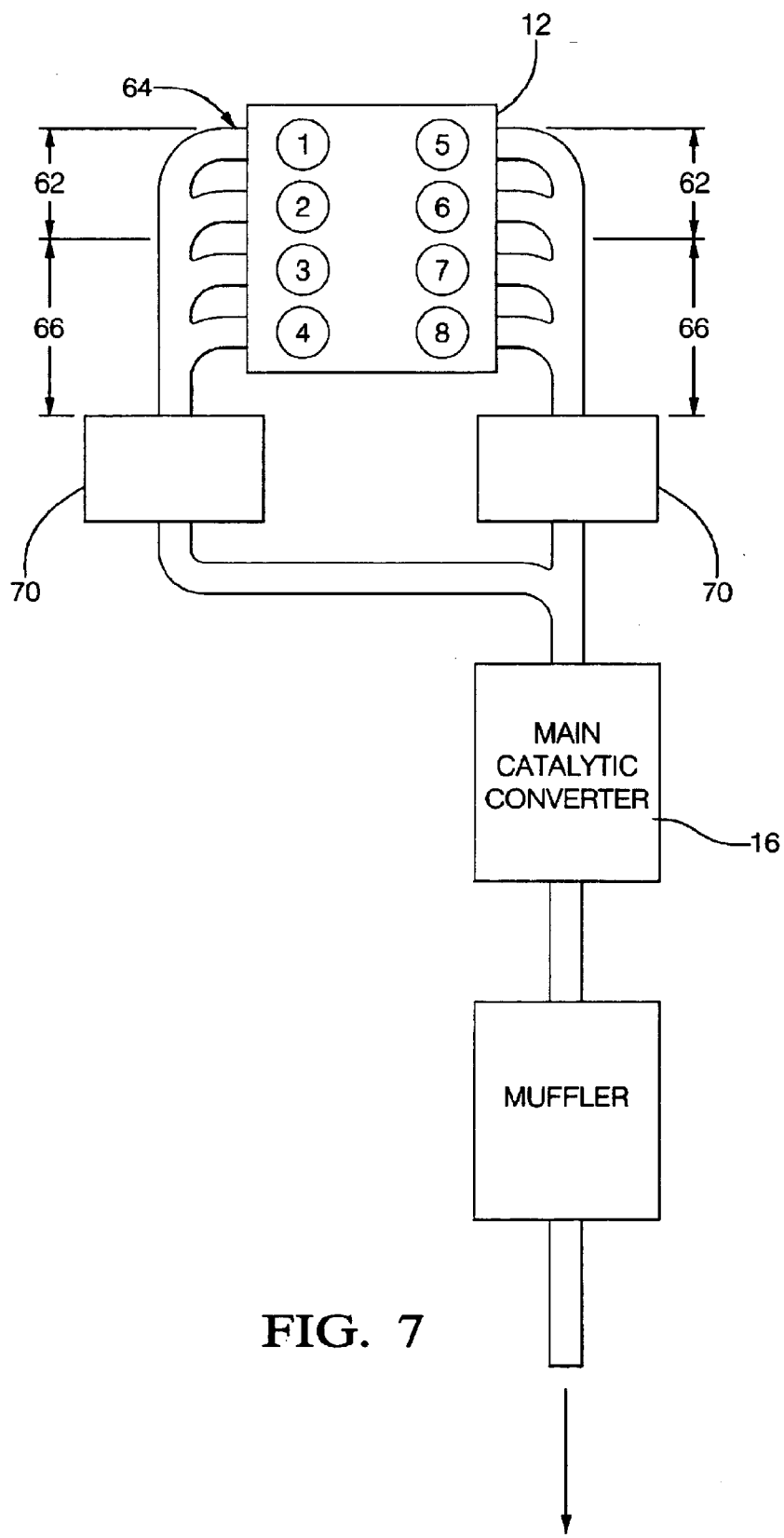
FIG. 7 is a schematic illustration of an exhaust system of yet another alternative exemplary embodiment of the present invention.

Referring now to FIG. 7, another alternative embodiment of an exemplary embodiment of the present invention is illustrated. Here engine 12 is also a "V8" eight cylinder and a pair of exhaust manifolds 64 are configured to be in fluid communication with all of the cylinders, which are evenly positioned on both sides of the engine. In this embodiment two warm up catalytic converters 70 are provided, one being in fluid communication with one of the exhaust manifolds and the other is in fluid communication with the other exhaust manifold. As is known in the related arts, the warm-up converter is small in size and located near the engine so that it could warm-up quickly. The warm up converter employs composite materials (i.e., a substrate, an oxidation catalyst and catalytic material coating) specially formulated to reach operating temperature quickly, thereby quickly rendering the warm-up converter capable of efficiently converting the pollutants in the exhaust gas.

Similar to the previous embodiments a portion 62 of each of the exhaust manifolds is eliminated while portion 66 is the shortest length to the respective warm up catalytic converter and portion 66 is heated by cylinders 3 and 4 on one side and cylinders 7 and 8 on the other, which remain activated during a "cold start". This would provide the most rapid simultaneous heating of both warm up catalytic converters 70. If heating of just one of the warm up catalytic converters was desired, based upon a particular exhaust emission test driving cycle and/or exhaust system design, cylinders 5, 6, 7, and 8, might be activated while cylinders 1, 2, 3, and 4, would be deactivated, shortly after, or during start-up. Alternatively, but less desirable due to the added length of exhaust pipe to the main converter 16, cylinders 5, 6, 7, and 8, might be deactivated while cylinders 1, 2; 3, and 4, are activated, shortly after, or during start-up.

Accordingly, and by permitting the exhaust system to be designed in such a manner such that at least two warm up catalytic converters are arranged in an advantageous manner (FIG. 7). In this case they are arranged such that one of the warm-up catalytic converters 70 receives only the exhaust gas from active cylinders 5, 6, 7, and 8, during initial start-up, or shortly after start-up, while cylinders 1, 2, 3, and 4, are deactivated. Then catalytic converter 16 receives the exhaust gases regardless of which cylinders are deactivated, and when none are deactivated. This system allows converter 16 to be heated to a desirable operating temperature prior to activating cylinders 1, 2, 3, and 4, in order to obtain very low start-up emissions.

Figure 8:
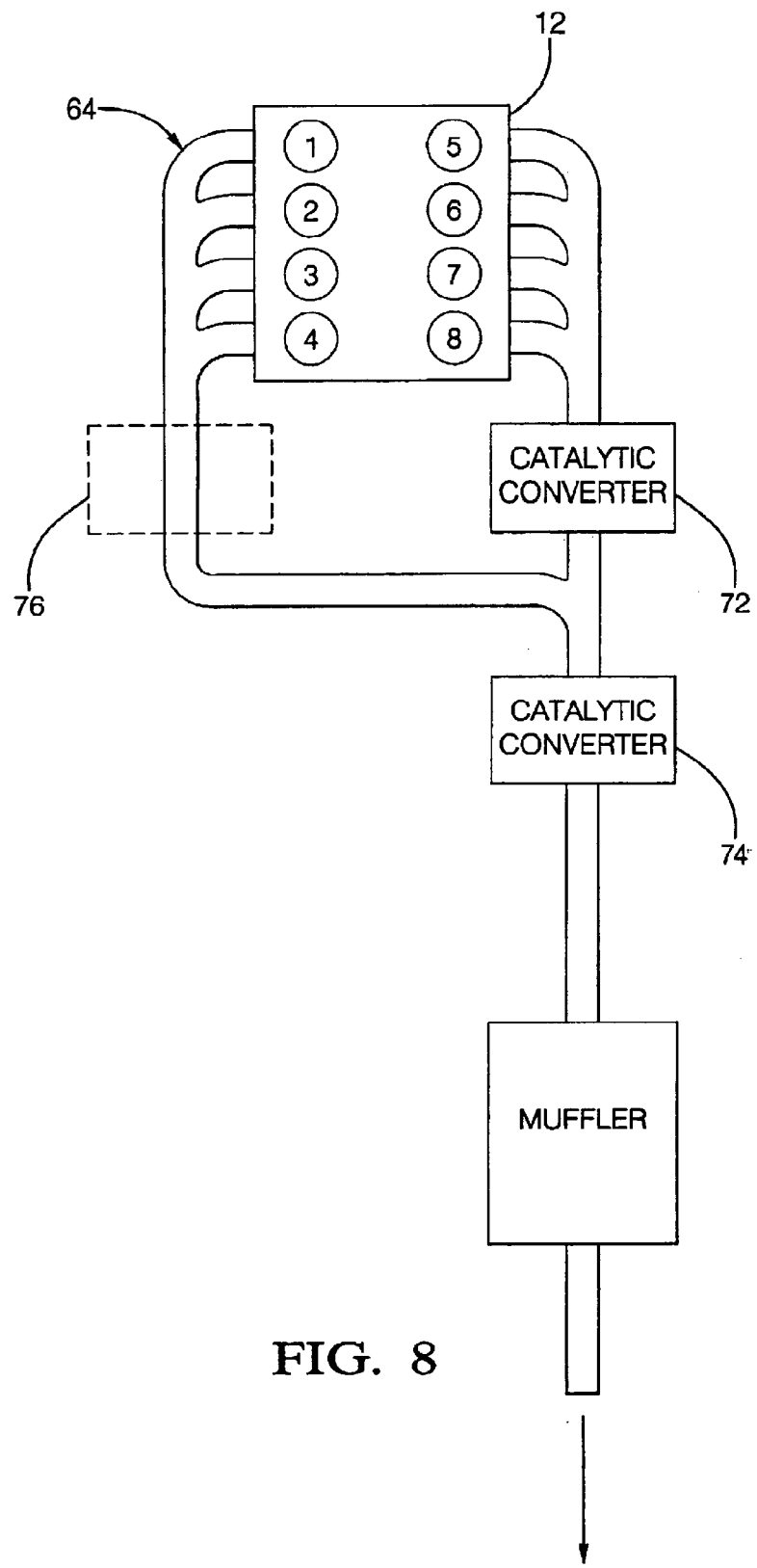
FIG. 8 is a schematic illustration of an exhaust system of still another alternative exemplary embodiment of the present invention.

In yet another embodiment and referring to FIG. 8 where a single catalytic converter is currently used, the exhaust system is configured to have a pair of converters 72, 74 each one about half the size of the original single converter. In this arrangement exhaust flow form active cylinders, 5, 6, 7, and 8 will go through both converters (72, 74) connected in series, and the exhaust flow from the cylinders deactivated during initial warm-up, 1, 2, 3, and 4, flows only through the second converter 74. The advantage of this system results from converter 74 being in the exhaust flow all the time. When cylinders 1, 2, 3, and 4, are activated, catalytic converter 74 should already be above the minimum operating temperature in order to make the exhaust from these cylinders harmless. This approach may only be preferred when the driving cycle is such that the temperature of converter 74 reaches its minimum operating temperature required to make the exhaust by-products of cylinders 1, 2, 3, and 4, harmless, before these cylinders are activated.

The advantages of the exhaust system shown in FIG. 8 are that it would be less costly (less converters) and it would have less exhaust back pressure that the system shown in FIG. 7. The lower cost results from using only one warm-up converter and the lower backpressure results form permitting cylinders 1, 2, and 3, and 4, to operate without a warm-up converter 70.

In yet another exemplary embodiment of the present invention cylinder deactivation is used to reduce the operating time of the initial warm-up converter or converters. This reduces the warm up converters deterioration at high mileage, thereby allowing it to maintain a relatively low minimum operating temperature for good start-up emission control. This can be accomplished by a system such as shown in FIG. 8, wherein through cylinder deactivation by the ECM cylinders 5, 6, 7, and 8, would be active shortly after start-up and cylinders 1, 2, 3, and 4, would be deactivated. After catalytic converter 16 reaches a temperature for good emission control, cylinders, 1, 2, 3, and 4, are activated and cylinders 5, 6, 7, and 8 are deactivated. With this approach, the initial start-up converter corresponding to cylinders 5, 6, 7 and 8 is removed from an exhaust path. Of course, when the operator of the vehicle demands more power than can be obtained during cylinder deactivation all cylinders are activated.

This approach makes best use of both converters. The warm-up converter operates with peak efficiency quickly due to its close proximity to the engine during the critical warm-up period. Thereafter, only the conventional converter treats the exhaust gases. While flowing through the section of the exhaust pipe leading to the conventional converter, the exhaust gases are lowered in temperature somewhat. Soon operating within the desired temperature range, the composite materials in the conventional converter efficiently treat the pollutants in the exhaust gases.

However, and as an alternative to the this embodiment, and if converter 74 does not receive enough heat energy to warm to operating temperature prior to activating cylinders 1, 2, 3, and 4, a warn-up converter 76 (illustrated in dashed lines) is positioned between cylinders 1, 2, 3 and 4 and converter 74.

Figure 9:
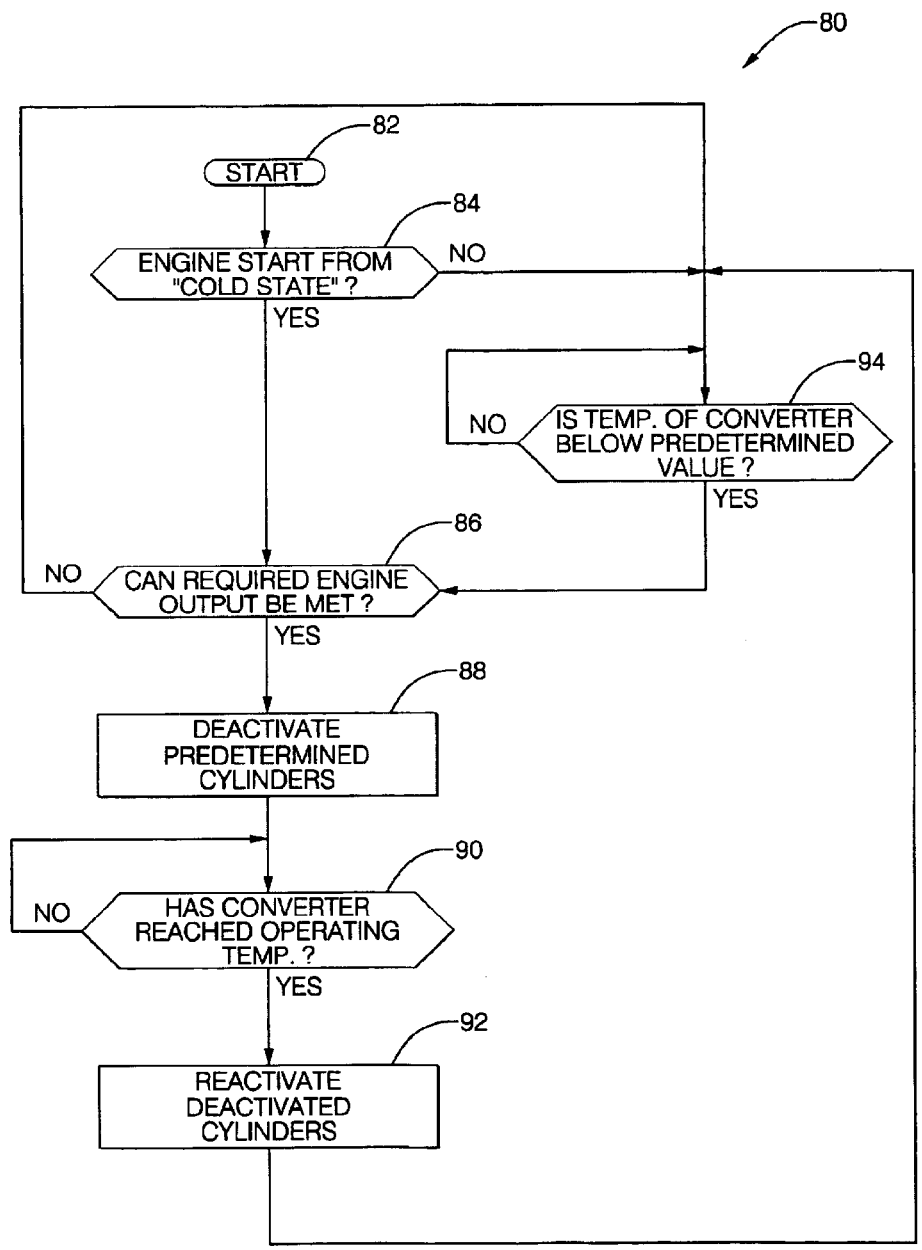
FIG. 9 is a flow chart of a portion of a control algorithm for use with various exemplary embodiments of the present invention.

Referring now to FIG. 9, a portion of a control algorithm 80 for use with the various exemplary embodiments of the present invention is illustrated. In an exemplary embodiment control algorithm 80 is resident upon a microprocessor of an engine control module of other equivalent device capable for performing a series of instructions.

At step 82 the algorithm is initialized, which may occur at vehicle power up. A step or decision block 84 determines if the engine is being started in a "cold state". If so a step or decision block 86 determines if the engine can meet the requested or required engine output by deactivating the predetermined cylinders corresponding to the longer exhaust path. Here the requested engine output or demand is determined by the required torque necessary to drive the engine or vehicle upon the current operating conditions (e.g., engine load, which may be related to numerous factors including but not limited to air conditioning on or off, speed of vehicle, acceleration, towing, state of charge of batteries including hybrid vehicles etc.).

If decision block 86 determines that the requested engine load can be met, the predetermined cylinders are deactivated and additional fuel and air are provided to the remaining active cylinders to meet the engine demand. This is illustrated at block 88.

At a step or decision block 90 the control algorithm will determine if the catalytic converter has reached the optimum temperature or is warmed up. If so and if applicable engine demand dictates the deactivated cylinders are reactivated at block 92.

Thereafter the temperature of the converter is monitored at decision block 94 to see if the catalytic converter has fallen below its optimum operating temperature. If so, the system returns to step or decision block 86. Decision block 94 also receives the negative outputs of blocks 84 and 86.

It is, of course, understood that the control algorithm illustrated in FIG. 9 is but one example of various implementations of exemplary embodiments of the present invention. For example, steps may be removed, added or rearranged. In one alternative, block 94 may be removed and the negative outputs of blocks 84, 86 and the output of block 92 are all inputted into block 84. Also, in yet another alternative an additional step is added to monitor the temperature and/or time of exposure of the "warm up" converter or converters in order to protect the same from excessive exposure.

It is understood that the processing of the above description may be implemented by a controller disposed internal, external, or internally and externally to an engine control unit (ECU) or the processing electronics and the controller can be located all in one device. In addition, processing of the above may be implemented through a controller operating in response to a computer program. In order to perform the prescribed functions and desired processing, as well as the computations therefore, the controller may include, but not be limited to, a processor(s), computer(s), memory, storage, register(s), timing, interrupt(s), communication interfaces, and input/output signal interfaces, as well as combinations comprising at least one of the foregoing.

In accordance with an exemplary embodiment, processing may be implemented through a controller, engine control unit and/or a processing device operating in response to a computer program. In order to perform the prescribed functions and desired processing, as well as the computations therefore (e.g., the execution of fourier analysis algorithm (s), the control processes prescribed herein, and the like), the controller may include, but not be limited to, a processor(s), computer(s), memory, storage, register(s), timing, interrupt (s), communication interfaces, and input/output signal interfaces, as well as combinations comprising at least one of the foregoing. For example, the controller may include signal input signal filtering to enable accurate sampling and conversion or acquisitions of such signals from communications interfaces.

As described above, the algorithms can be embodied in the form of computer-implemented processes and apparatuses for practicing those processes. The algorithms can also be embodied in the form of computer program code containing instructions embodied in tangible media, such as floppy diskettes, CD-ROMs, hard drives, or any other computer-readable storage medium, wherein, when the computer program code is loaded into and executed by a computer and/or controller, the computer becomes an apparatus for practicing the invention. Existing systems having reprogrammable storage (e.g., flash memory) that can be updated to implement various aspects of command code, the algorithms can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer. When implemented on a general-purpose microprocessor, the computer program code segments configure the microprocessor to create specific logic circuits.

The control module includes a series of computer-executable instructions, as described herein, which will allow exemplary embodiments of the present invention to be implemented. These instructions may reside, for example, in RAM of the control module. Alternatively, the instructions may be contained on a data storage device with a computer readable medium, such as a computer diskette. Or, the instructions may be stored on a magnetic tape, conventional hard disk drive, electronic read-only memory, optical storage device, or other appropriate data storage device. In an illustrative embodiment of the invention, the computer-executable instructions may be lines of compiled C++ compatible code.

The flow charts illustrated herein provide an example of the logic of a portion of a control algorithm for performing instructions in accordance with an exemplary embodiments of the present invention as embodied in computer program software. Those skilled in the art will appreciate that the flow charts illustrate the portions of computer program code including but not limited to logic circuits on an integrated circuit. As discussed, herein the term "engine" is meant in the broad sense to include all combustors which combust hydrocarbon fuels to provide heat, e.g., for direct or indirect conversion to mechanical or electrical energy. Internal combustion engines of the Otto, Diesel and turbine types, as well as burners and furnaces, are included and can benefit from the invention. The diesel engine is in this description for purposes of providing an example. Stationary and mobile engines are also contemplated to be within the scope of exemplary embodiments of the present invention.

The term "Diesel engine" includes all compression-ignition engines, for both mobile (including marine) and stationary power plants and of the two-stroke per cycle, four-stroke per cycle and rotary types. The term "hydrocarbon fuel" includes all fuels prepared from "distillate fuels" or "petroleum" (e.g., gasoline, jet fuel, diesel fuel, and various other distillate fuels). The term "distillate fuel" means all of those products prepared by the distillation of petroleum or petroleum fractions and residues. The term "petroleum" is meant in its usual sense to include all of those materials regardless of source normally included within the meaning of the term, including hydrocarbon materials, regardless of viscosity, that are recovered from fossil fuels.

The term "diesel fiel" means "distillate fuels" including diesel fuels meeting the ASTM definition for diesel fuels or others even though they are not wholly comprised of distillates and can comprise alcohols, ethers, organo-nitro compounds and the like (e.g., methanol, ethanol, diethyl ether, methyl ethyl ether, nitromethane). Also within the scope of this invention, are emulsions and liquid fuels derived from vegetable or mineral sources such as corn, alfalfa, shale, and coal. These fuels may also contain other additives known to those skilled in the art, including dyes, cetane improvers, anti-oxidants such as 2,6-di-tertiary-butyl-4-methylphenol, corrosion inhibitors, rust inhibitors such as alkylated succinic acids and anhydrides, bacteriostatic agents, gum inhibitors, metal deactivators, upper cylinder lubricants, antiicing agents and the like.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. It should also be noted that the terms "first", "second", and "third" and the like may be used herein to modify elements performing similar and/or analogous functions. These modifiers do not imply a spatial, sequential, or hierarchical order to the modified elements unless specifically stated.

What is claimed is:

1. An exhaust system for a vehicle having an internal combustion engine with a plurality of cylinders, comprising:

a exhaust manifold for providing fluid communication of exhaust of the plurality of cylinders to a catalytic converter, said exhaust manifold comprising a first exhaust pipe portion and a second exhaust pipe portion, said first exhaust pipe portion being in fluid communication with said second exhaust pipe portion and said second exhaust pipe portion being in fluid communication with said catalytic converter, said first exhaust pipe portion providing a first fluid path for exhaust of a first plurality of cylinders of the engine and said second exhaust pipe portion providing a second fluid path for exhaust of a second plurality of cylinders of the engine, said second fluid path being shorter than said first fluid path; and a controller for determining whether to deactivate said first plurality of cylinders in accordance with a predetermined engine starting condition, wherein deactivation of said first plurality of cylinders causes said second plurality of cylinders to operate at a condition corresponding to an engine output demand, wherein an exhaust of a first temperature is expelled by said second plurality of cylinders into said catalytic converter through said seond fluid path, said first temperature being greater than an exhaust temperature that would be generated by said first and said second plurality of cylinders operating at said condition corresponding to said engine output demand, wherein the efficiency of said catalytic converter at engine start-up is increased as the catalytic converter will be brought to an operating temperature faster than a time required if no cylinders were deactivated and engine exhaust is flowing through both said first fluid path and said second fluid path.

2. The exhaust system as in claim 1, wherein said first plurality of cylinders and said second plurality of cylinders are on opposite sides of the engine.

3. The exhaust system as in claim 1, wherein said engine output demand corresponds to a "cold start" of the engine, or any start where the catalytic converter catalyst is below a minimum operating temperature.

4. The exhaust system as in claim 1, wherein said first plurality of cylinders and said second plurality of cylinders are on the same side of the engine.

5. The exhaust system as in claim 4, wherein said first plurality of cylinders are located at a forward end of the vehicle.

6. The exhaust system as in claim 1, wherein said controller receives input signals from a plurality of sensors in order to determine if the engine is being started in said predetermined engine starting condition.

7. The exhaust system as in claim 6, wherein said predetermined engine starting condition is a "cold start" of the engine.

8. The exhaust system as in claim 7, wherein said plurality of sensors provide signals indicative of operating parameters including any combination of the following: catalyst temperature, engine coolant temperature, engine speed, engine load, engine temperature, intake valve position, exhaust valve position and exhaust oxygen sensor temperature measurements, to said controller.

9. The exhaust system as in claim 1, wherein said controller deactivates said predetermined cylinders by sending control signals to actuators configured and positioned to retard the movement of intake and exhaust valves of said plurality of cylinders, wherein said control signals cause said predetermined cylinders to be deactivated by closing intake and exhaust valves of said predetermined cylinders.

10. The exhaust system as in claim 9, wherein air is periodically allowed into combustion chambers of said predetermined cylinders during a cranking event, or during operation of the engine and the air is compressed in said predetermined cylinders when the engine is running.

11. The exhaust system as in claim 10, wherein said intake and exhaust valves of said predetermined cylinders are manipulated by signals generated by said controller in order to allow the air into the combustion chambers of said predetermined cylinders.

12. An exhaust system for a vehicle having an internal combustion engine with a plurality of cylinders, comprising:
  a pair of exhaust manifolds each providing fluid communication of exhaust of a plurality of cylinders to a catalytic converter, each of said pair of exhaust manifolds comprising a first exhaust pipe portion and a second exhaust pipe portion, said first exhaust pipe portion being in fluid communication with said second exhaust pipe portion and said second exhaust pipe portion being in fluid communication with said catalytic converter, said first exhaust pipe portion providing a first fluid path for exhaust of a first plurality of cylinders of the engine and said second exhaust pipe portion providing a second fluid path for exhaust of a second plurality of cylinders of the engine, said second fluid path being shorter than said first fluid path; and
  a controller for determining whether to deactivate predetermined cylinders of said first plurality of cylinders and predetermined cylinders of said second plurality of cylinders in accordance with a predetermined engine starting condition, wherein deactivation of said predetermined cylinders of said first plurality of cylinders and said predetermined cylinders of said second plurality of cylinders causes the remaining active cylinders of said first plurality of cylinders and said second plurality of cylinders to operate at a condition corresponding to an engine output demand, wherein an exhaust of a first temperature is expelled by said remaining active cylinders of said first plurality of cylinders and said second plurality of cylinders into said catalytic converter of said first exhaust portion and said second exhaust portion, said first temperature being greater than an exhaust temperature that would be generated by said first plurality of cylinders and said second plurality of cylinders operating at said condition corresponding to said engine output demand, wherein the efficiency of said catalytic converter at engine start-up is increased as the catalytic converter will be brought to an operating temperature faster than a time required if no cylinders were deactivated and engine exhaust is flowing through an entire length of said pair of exhaust manifolds.

13. The exhaust system as in claim 12, wherein said controller receives input signals from a plurality of sensors in order to determine if the engine is being started in said predetermined engine starting condition.

14. The exhaust system as in claim 13, wherein said predetermined engine starting condition is a "cold start" or a warm start of the engine and wherein said controller deactivates said predetermined cylinders by sending control signals to actuators configured and positioned to retard the movement of intake and exhaust valves of said plurality of cylinders, wherein said control signals cause said predetermined cylinders to be deactivated by closing intake and exhaust valves of said predetermined cylinders.

15. The exhaust system as in claim 14, wherein air is allowed into combustion chambers of said predetermined cylinders during a cranking event, and after start-up of the engine and the air is compressed in said predetermined cylinders when the engine is running and wherein said intake and exhaust valves of said predetermined cylinders are manipulated by signals generated by said controller in order to periodically allow the air into the combustion chambers of said predetermined cylinders.

16. The exhaust system as in claim 15, wherein a plurality of sensors provide signals indicative of catalyst temperature, engine coolant temperature, engine speed, engine load, engine temperature, intake valve position, exhaust valve position and exhaust oxygen sensor temperature to said controller.

17. An exhaust system for a vehicle having an internal combustion engine with a plurality of cylinders, comprising:
  a pair of exhaust manifolds each providing fluid communication of exhaust of a plurality of cylinders to a single catalytic converter, each of said pair of exhaust manifolds comprising a first exhaust pipe portion and a second exhaust pipe portion, said first exhaust pipe portion being in fluid communication with said second exhaust pipe portion and said second exhaust pipe portion being in fluid communication with said catalytic converter, said first exhaust pipe portion providing a first fluid path for exhaust of a first plurality of said plurality of cylinders of the engine and said second exhaust pipe portion providing a second fluid path for exhaust of a second plurality of said plurality of cylinders of the engine, said second fluid path being shorter than said first fluid path;
  a warm up converter disposed between said single catalytic converter and one of said pair of said exhaust manifolds wherein the other one of said pair of said exhaust manifolds provides fluid communication to said single catalytic converter without passing through said warm up converter; and
  a controller for determining whether to deactivate predetermined cylinders of said plurality of cylinders, in accordance with a predetermined engine starting condition, said predetermined cylinders being in fluid communication with said catalytic converter, wherein deactivation of said predetermined cylinders of said plurality of cylinders causes the remaining active cylinders of said plurality of cylinders to operate at a condition corresponding to an engine output demand, wherein an exhaust of a first temperature is expelled by said remaining active cylinders of said plurality of cylinders into said warm up converter, said first temperature being greater than an exhaust temperature that would be generated by all plurality of cylinders operating at said condition corresponding to said engine output demand, wherein the efficiency of said catalytic converter at engine start-up is increased as the catalytic converter will be brought to an operating temperature faster than a time required if no cylinders were deactivated and engine exhaust is flowing through an entire length of said pair of exhaust manifolds.

18. The exhaust system as in claim 17, wherein said controller further comprises an algorithm for activating said predetermined cylinders and deactivating the remaining cylinders when said catalytic converter has reached an effective operating temperature and engine operating load, wherein the exposure of said warm up converter to the engine exhaust is minimized.

19. The exhaust system as in claim 17, wherein said controller receives input signals from a plurality of sensors in order to determine if the engine is being started in said predetermined engine starting condition.

20. The exhaust system as in claim 19, wherein said predetermined engine starting condition is a "cold start" of the engine or a warm start when the controller indicates the catalyst temperature is below minimum operating temperature and wherein said controller deactivates said predetermined cylinders by sending control signals to actuators configured and positioned to retard the movement of intake and exhaust valves of said plurality of cylinders, wherein said control signals cause said predetermined cylinders to be deactivated by closing intake and exhaust valves of said predetermined cylinders.

21. The exhaust system as in claim 17, further comprising another warm up converter disposed between said single catalytic converter and the other one of said pair of said exhaust manifolds, wherein said controller determines whether to deactivate predetermined cylinders, in accordance with the operating temperature of said warm up converter.

22. The exhaust system as in claim 21, wherein a plurality of sensors provide signals indicative of catalyst temperature, engine coolant temperature, engine speed, engine load, engine temperature intake valve position, exhaust valve position and exhaust oxygen sensor temperature to said controller.

23. A method for reducing exhaust emissions of an engine having a plurality of cylinders each having exhaust ports coupled to an exhaust system having a catalytic converter, the method comprising:

determining a first plurality and a second plurality of said plurality of cylinders, said first plurality of cylinders having a longer exhaust path to said catalytic converter than said second plurality of cylinders;

determining if the engine is being started from a cold state by sampling at least the temperature of the engine to indicate if the catalytic converter disposed in the exhaust system is below operating temperature;

deactivating said first plurality of cylinders if the engine is being started from a cold state;

supplying additional fuel to said second plurality of cylinders, wherein deactivation of said first plurality cylinders causes said second plurality of cylinders to operate at a condition corresponding to an engine output demand, wherein an exhaust of a first temperature is expelled by said second plurality of cylinders into said warm up converter, said first temperature being greater than an exhaust temperature that would be generated by all plurality of cylinders operating at said condition corresponding to said engine output demand, wherein the efficiency of said catalytic converter at engine start-up is increased as the catalytic converter will be brought to an operating temperature faster than a time that would be required if no cylinders were deactivated and the engine exhaust is flowing through an exhaust path of both the first plurality of cylinders and the second plurality of cylinders.

24. A medium encoded with a machine-readable computer program code for periodically reducing exhaust emissions of an engine having a plurality cylinders each having exhaust ports coupled to an exhaust system having a catalytic converter, said medium including instructions for implementing the method comprising:

determining if the engine is being started from a cold state by sampling at least the temperature of the engine to indicate if the catalytic converter disposed in the exhaust system is below operating temperature;

deactivating a first plurality of a plurality of cylinders of the engine, said first plurality of cylinders having a longer exhaust path to said catalytic converter than a second plurality of cylinders, if the engine is being started from a cold state;

supplying additional fuel to said second plurality of cylinders, wherein deactivation of said first plurality cylinders causes said second plurality of cylinders to operate at a condition corresponding to an engine output demand, wherein an exhaust of a first temperature is expelled by said second plurality of cylinders into a warm up converter, said first temperature being greater than an exhaust temperature that would be generated by all plurality of cylinders operating at said condition corresponding to said engine output demand, wherein the efficiency of said catalytic converter at engine start-up is increased as the catalytic converter will be brought to an operating temperature faster than a time that would be required if no cylinders were deactivated and the engine exhaust is flowing through an exhaust path of both the first plurality of cylinders and the second plurality of cylinders.

25. The medium of claim 24, wherein the method further comprises:

determining if the catalytic converter is at a predetermined operating temperature.

* * * * *